June 11, 1929.    R. OPPENHEIM    1,717,244
GAS ACCUMULATOR
Filed June 6, 1925
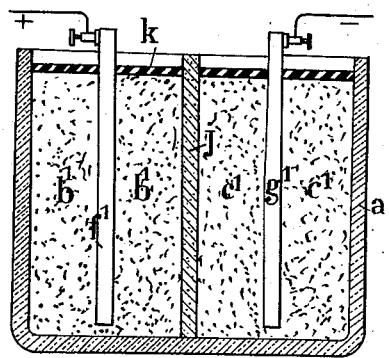
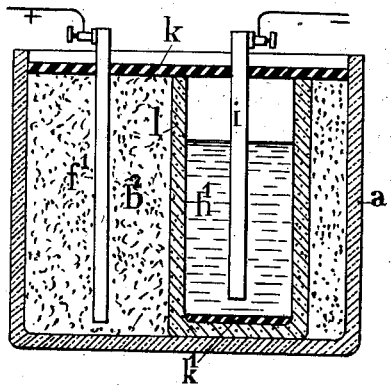
Rene Oppenheim
INVENTOR
By: Marks & Clerk
Attys.

Patented June 11, 1929.

1,717,244

UNITED STATES PATENT OFFICE.

RENÉ OPPENHEIM, OF LEVALLOIS-PERRET, FRANCE, ASSIGNOR TO SOCIETE LE CARBONE, OF LEVALLOIS-PERRET, FRANCE.

GAS ACCUMULATOR.

Original application filed May 20, 1924, Serial No. 714,711. Divided and this application filed June 6, 1925. Serial No. 35,467.

The present application is a division of my application No. 714,711, filed May 20th 1924.

The so-called "gas" battery accumulators, that is to say accumulators restoring the energy of the ionized gases, have, as is well known, various advantages, chief among them being that their weight in relation to the available quantities of energy is low in comparison with that of lead accumulators. For example, their formation is very rapid, and their conditions of charge and discharge afford a wide range of utility.

This type of accumulator has up to the present however the disadvantage of having an insufficient output because of the accumulation of the gases which takes place in the centre of the electrolyte and the output is thus restricted by the degree of solubility of these gases in the electrolyte.

Now the object of the present invention is to devise gas accumulators which, besides the qualities of the present gas accumulators, possess the advantage of having a large output.

The gas battery or accumulator of this invention is essentially characterized by the fact that it comprises a medium of great absorbing power in a small volume storing up the gases which originate from the charge and restoring them at the time of the discharge.

The invention consists substantially in the use of electrodes capable of absorbing the gases and which are constituted, for this purpose, by a porous body being also a good conductor of electricity, possessing a high absorbent power, and being protected over the whole of its surface by a coating impermeable to liquids though permeable by gases.

This porous body, due to its special character, can concentrate during charging under a low pressure a considerable quantity of gas, which it retains as long as the circuit remains open and only releases it at the moment of the discharge.

The following advantages are thus obtained:

(a) The accumulation, with a small pressure, of a large quantity of energy, this latter being in proportion to the weight of the gas liberated.

(b) Work practically nul with an open circuit.

(c) A practically perfect output when the gas or gases is or are again liberated so as to reconstitute the electrolyte.

In the accumulator of the present invention, the porous electrode is formed of an intimate mixture of a powder formed of porous grains, for instance of a charcoal powder and of a nonmetallic colloidal suspension, capable of pectization, in which the electrolyte is incorporated so that the electrolyte is immobilized. Under the action of the absorbent properties of the grains of powder, the colloidal solution forms upon the whole surface of each of these latter a pectized film impermeable to the electrolyte though still permeable to the reaction gases.

According to the nature of the electrolyte used, the two electrodes of the accumulator or one of them only will be constituted in accordance with the present invention.

When the electrolyte used causes the formation of two gases, the two electrodes are constituted as above stated. In this case the cell is divided by a porous diaphragm into two compartments each filled with the porous electrolytic body and in each of which there is inserted a current conductor, formed of a material which is not attacked by the electrolyte and which is a good conductor of electricity, as for instance a plate of retort carbon.

If the electrolyte decomposes into a gas and a metal, the anode alone presents the arrangement described above; the cathode, on the contrary, is formed of a metal rod or plate, of the same metal as that forming the basis of the electrolyte. This plate or rod penetrates into a solution of this electrolyte, contained in a porous vessel placed in the center of the porous mass forming the positive electrode.

In order that the invention may be clearly understood, two methods of application of the same will be described hereafter, by way of example, with reference to the accompanying drawing in which:

Fig. 1 shows an embodiment of the invention applicable in cases where the electrolyte decomposes into two gaseous elements.

Fig. 2 shows a modification, applicable in in case the electrolyte used decomposes into a gas and a metal.

The embodiment illustrated in Fig. 1, applicable in case the electrolyte used decomposes into two gaseous elements, comprises a jar $a$ of an insulating material which is not attacked by the electrolyte, glass for instance, divided into two compartments by a diaphragm $j$ made of porous earth for instance, each of these compartments is filled with a pasty mass $b^1$ $c^1$ composed of a mixture of porous powder and electrolyte obtained in the following manner:

A colloidal suspension is prepared of fecula or starch, for example arrow-root flour, adding to said fecula about twice its weight in water and heating the emulsion thus obtained to about 90° C. With this colloidal suspension is mixed about an equal weight of fine charcoal powder either pure or mixed with plumbago, and to the mass is then added a concentrated solution of the electrolyte, say hydrochlorate of ammonia for example the whole mass being mixed together to form a paste, the electrolyte being thus immobilized.

Two plates or rods $f^1$ $g^1$ of retort carbon penetrate into the centre of the electrolytic porous mass $b^1$, $c^1$, contained in the two compartments of the vat $a$, these plates or rods $f^1$ $g^1$ form the two uptakes for the positive and negative current.

The jar $a$ is hermetically closed at its upper part by a layer of wax, or other suitable material $k$ opposing the egress of the gases and facilitating the transportation of the apparatus.

In the course of the charging the chlorine, released by the electrolyte, is absorbed by the porous powder of the anodic mass $b^1$ and the ammonia concentrates in the porous powder of the cathodic mass $c^1$.

During the discharge the chlorine and the ammonia are restored by the two porous masses $b^1$ $c^1$ and are recombined so as to form hydrochlorate of ammonia.

Figure 2 shows a manner of carrying out the invention, by also using a porous electrode and applicable in case the electrolyte used decomposes into a gas and a metal.

In this apparatus the anode is formed by a porous electrolytic mass $b^2$ obtained as hereinbefore set forth, but in which the electrolyte used is chloride of zinc. A plate or rod $f^1$ of retort carbon constitutes the positive conductor and penerates to the centre of this porous electrolytic mass $b^2$ contained in the vat $a$.

The cathod is a plate or rod of zinc $i$ penetrating into a porous vessel $l$, of potteryware for example, closed at its lower part by a coating of wax $k^1$, or other suitable material. This porous vessel contains a concentrated solution of zinc chloride $h^1$ and is surrounded by the porous electrolytic mass $b^2$.

The jar $a$ and the porous vessel $l$ are closed hermetically at their upper part by a layer of wax $k$.

In the course of the charging, the zinc, released from the chloride of zinc forming the electrolyte, is deposited upon the zinc plate or rod $i$ which forms the cathode, and the chlorine is absorbed by the porous powder of the anodic mass $b^2$.

At the time of discharge the chlorine is restored by this latter and dissolves the zinc deposited upon the cathode $i$.

It is to be understood that the methods of application hereinbefore set forth are only given by way of example, and that the form, sizes, nature of the materials employed and the structural details may vary according to the different applications of the invention.

Claims:—

1. In a gas accumulator, an intimate mixture of a finely divided porous conducting material, a pectizable colloidal solution and a concentrated solution of an electrolyte, said colloidal solution serving to both render the porous conducting material impermeable to liquids without destroying its permeability to gases and to immobilize the electrolyte, and current conducting means penetrating the center of said mixture, said means being unattackable by the electrolyte.

2. A gas accumulator comprising current conducting elements, unattackable by electrolyte, and a porous electrolytic mass composed of an intimate mixture of a porous finely divided conducting material, a concentrated solution of an electrolyte, and a pectizable colloidal solution, said latter solution serving to both immobilize the electrolyte and to render the conducting material impermeable to liquids though still retaining permeability to gases.

3. The accumulator as in claim 1, in which the porous conducting material comprises charcoal.

4. The accumulator as in claim 1 in which the porous conducting material comprises charcoal and plumbago.

5. The accumulator as in claim 1 in which the porous conducting material comprises charcoal and the colloidal solution is a colloidal suspension of fecula.

6. A gas accumulator comprising at its positive pole an electrolyte-unattackable electrode disposed in a porous electrolytic mass composed of an intimate mixture of finely divided charcoal, a concentrated solution of an electrolyte and a pectizable colloidal solution, said latter solution serving both to immobilize the electrolyte and to render the charcoal impermeable to liquids though still retaining permeability to gases, at its negative pole a concentrated solution of electrolyte in which is disposed an electrode of the same metal as that forming the anion of the electrolyte, and a porous partition separating the porous electrolytic mass from the solution about the negative pole.

7. A gas accumulator comprising at its positive pole an electrolyte-unattackable electrode disposed in a porous electrolytic mass composed of an intimate mixture of finely divided charcoal, a concentrated solution of zinc chloride and a colloidal suspension of fecula, said latter suspension serving both to immobilize the zinc chloride solution and to render the charcoal impermeable to liquids though still retaining permeability to gases, at its negative pole a concentrated solution of zinc chloride in which is disposed an electrode of zinc, and a porous partition separating the porous electrolytic mass from the solution about the negative pole.

The foregoing specification of my "gas accumulator" signed by me this 26th day of May, 1925.

RENÉ OPPENHEIM.